(12) United States Patent
Kwak et al.

(10) Patent No.: US 8,606,175 B2
(45) Date of Patent: Dec. 10, 2013

(54) RF RELAY OF FULL-DUPLEX AND METHOD FOR REMOVING INTERFERENCE OF EM LEVEL THEREOF

(75) Inventors: Byung-Jae Kwak, Seoul (KR); Joon Ho Cho, Pohang-si (KR); Hyun Kyu Chung, Daejeon (KR); Young Yun Kang, Pohang-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 293 days.

(21) Appl. No.: 12/956,504

(22) Filed: Nov. 30, 2010

(65) Prior Publication Data

US 2011/0130090 A1    Jun. 2, 2011

(30) Foreign Application Priority Data

Nov. 30, 2009    (KR) .................. 10-2009-0116848

(51) Int. Cl.
*H04B 1/60*    (2006.01)

(52) U.S. Cl.
USPC ............... 455/9; 455/7; 455/63.1; 455/67.11

(58) Field of Classification Search
USPC ............ 455/24, 562.1, 67.13, 63.1, 7, 9, 15, 455/442, 452.2, 296, 101, 507, 501; 370/315, 278, 279, 329, 277, 210; 375/211, 260, 141, 146, 147, 219
See application file for complete search history.

(56) References Cited

U.S. PATENT DOCUMENTS

| | | | |
|---|---|---|---|
| 7,733,813 B2 | 6/2010 | Shin et al. | |
| 2004/0110469 A1 | 6/2004 | Judd et al. | |
| 2007/0230547 A1* | 10/2007 | Asai et al. ................. | 375/219 |
| 2008/0225930 A1 | 9/2008 | Proctor et al. | |
| 2009/0290516 A1 | 11/2009 | Han et al. | |
| 2010/0062708 A1* | 3/2010 | Sangiamwong et al. ....... | 455/24 |
| 2010/0227566 A1* | 9/2010 | Kim et al. ................. | 455/67.13 |

FOREIGN PATENT DOCUMENTS

| | | |
|---|---|---|
| KR | 10-2009-0012956 | 2/2009 |
| KR | 10-2009-0021737 | 3/2009 |
| KR | 10-2009-0046094 | 5/2009 |
| KR | 10-2009-0122041 | 11/2009 |
| WO | 02/054628 | 7/2002 |
| WO | 2008/004916 | 1/2008 |
| WO | 2008/147269 A1 | 12/2008 |
| WO | 2009/061084 A1 | 5/2009 |
| WO | 2009/088328 A1 | 7/2009 |

OTHER PUBLICATIONS

Spatial loop interference suppression in full-duplex MIMO relays, Author(s): Taneli Riihonen, Stefan Werner and Risto Wichman, pp. 1508-1512, date of conference: Nov. 1-4, 2009.*

* cited by examiner

*Primary Examiner* — Edward Urban
*Assistant Examiner* — Golam Sorowar
(74) *Attorney, Agent, or Firm* — Staas & Halsey LLP

(57) ABSTRACT

A RF relay of a full-duplex generates a conversion matrix to belong to a null space of a channel matrix of an interference channel, generates a transmitting signal by converting a received signal using the conversion matrix, and then outputs the transmitting signal to a transmitting antenna. Therefore, an interference signal of an electromagnetic wave level (EM level) that can be generated while the transmitting signal passes through the interference channel can be canceled.

13 Claims, 6 Drawing Sheets

RF RELAY OF FULL-DUPLEX AND METHOD FOR REMOVING INTERFERENCE OF EM LEVEL THEREOF

CROSS-REFERENCE TO RELATED APPLICATION

This application claims priority to and the benefit of Korean Patent Application No. 10-2009-0116848 filed in the Korean Intellectual Property Office on Nov. 30, 2009, the entire contents of which are incorporated herein by reference.

BACKGROUND OF THE INVENTION (a) Field of the Invention

The present invention relates to a RF relay of a full-duplex, and a method of removing interference of an electromagnetic wave level thereof.

(b) Description of the Related Art

In a cellular system, in order to improve spectral efficiency and extend coverage, a repeater is used between a base station and a terminal. An optical repeater and a wireless repeater or radio frequency (RF) relay are used as the repeater.

The optical repeater receives a signal through an optical cable and retransmits the signal, and thus interference does not occur between a transmitter and a receiver. However, much cost is required to install an optical cable, and particularly, when a small number of users exist in a wide area, it is inefficient to construct an optical cable infrastructure.

Recently, research on a RF relay of which installation cost is less than that of an optical repeater and that can freely select an installation area has been actively performed. The RF relay receives a radio frequency (RF) signal with a receiving antenna and retransmits the RF signal with a transmitting antenna. A duplexing method of such a RF relay is classified as a half-duplex method and a full-duplex method. Because the half-duplex RF relay transmits and receives a RF signal using two orthogonal channels in a time domain or a frequency domain, interference of a transmitting signal does not exist in a receiver. On the other hand, because the full-duplex RF relay simultaneously transmits and receives a RF signal, the full-duplex RF relay has very high spectral efficiency, but it is difficult to physically implement the full-duplex RF relay due to interference of a transmitting signal.

Various methods of removing an interference signal in order to implement a full-duplex RF relay have been suggested. Representatively, a method of removing an interference signal by processing a radio frequency signal that is received in the receiving antenna or a method of removing an interference signal through digital signal processing after converting an intermediate frequency signal to a digital signal is used.

According to such interference removing technology, after an interference signal that is generated in the transmitting antenna is received in the receiving antenna, the RF relay processes the interference signal. That is, after an interference signal is received, the interference signal is removed through post-processing and thus there is a limitation in improving performance of the RF relay. Further, because power intensity of an interference signal is much greater than that of a received signal that is received from a base station, a problem of signal distortion due to non-linearity of a low noise amplifier in a receiver of a RF relay and signal distortion due to resolution insufficiency of an analog to digital converter (ADC) when converting to a digital signal cannot be solved. Further, because much time is required for signal processing for removing an interference signal, there is a problem that a delay time is lengthened in the RF relay.

Further, a method of removing interference signal in an electromagnetic wave (EM) level by greatly increasing the distance between a transmitting antenna and a receiving antenna has been proposed, but when installing such a RF relay, the RF relay can only be used in a partial environment due to spatial restrictions. Therefore, a method of removing interference of an EM level is required so that an interference signal that is generated in a transmitting antenna is not received in the receiving antenna without greatly increasing the distance between the transmitting antenna and a receiving antenna of a full-duplex RF relay.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a RF relay of a full-duplex and a method of removing interference of an EM level thereof having advantages of allowing an interference signal generated in a transmitting antenna to not be received in a receiving antenna.

An exemplary embodiment of the present invention provides a method of removing an interference signal of an EM level that is received through an interference channel in a RF relay of a full-duplex method that relays a radio frequency signal between a base station and a terminal. The method of removing an interference signal includes generating a conversion matrix to belong to a null space of a channel matrix of the interference channel, generating a transmitting signal by converting a received signal using the conversion matrix, and transmitting the transmitting signal.

Another embodiment of the present invention provides a RF relay of a full-duplex method. The RF relay of a full-duplex method includes a channel estimation unit, a matrix generator, and an interference removing unit. The channel estimation unit estimates a modulation channel between a base station and the RF relay and between the RF relay and the terminal, and an interference channel. The matrix generator generates a conversion matrix to belong to a null space of a channel matrix of the interference channel using an estimate of the modulation channel and the interference channel. The interference removing unit generates a transmitting signal by converting a received signal using the conversion matrix.

According to an exemplary embodiment of the present invention, because a transmitting signal is designed so that an interference signal of an EM level generated by a transmitting antenna of a RF relay of a full-duplex is not received through a receiving antenna, an interference signal of an EM level can be removed or minimized, thereby optimizing performance of the RF relay.

DETAILED DESCRIPTION OF THE EMBODIMENTS

Figure 1:
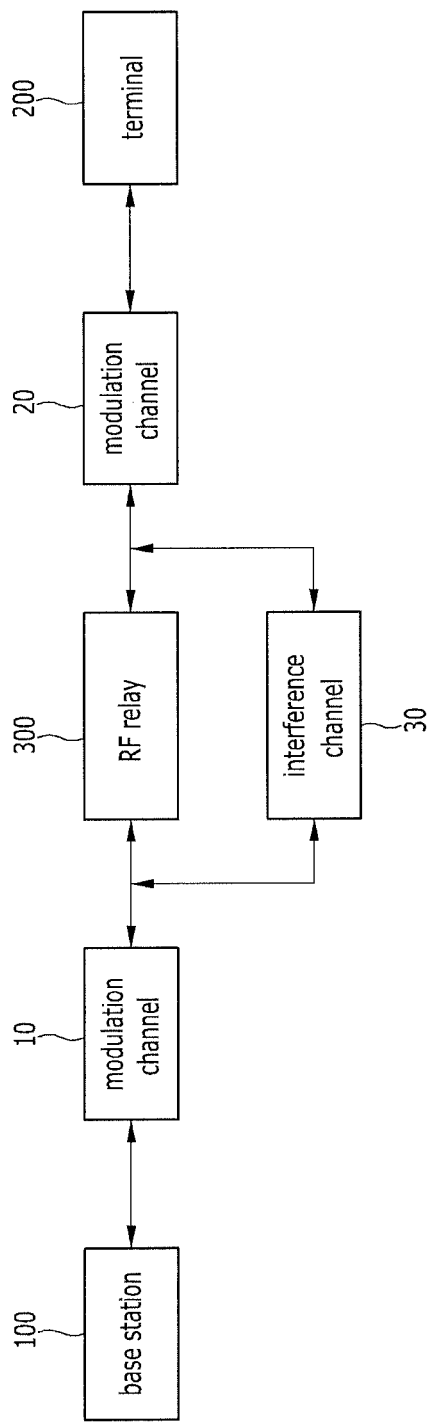
FIG. 1 is a block diagram illustrating a communication system that can apply to a RF relay according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, in the specification and claims, unless explicitly described to the contrary, the word "comprise" and variations such as "comprises" or "comprising" will be understood to imply the inclusion of stated elements but not the exclusion of any other elements.

Now, a RF relay of a full-duplex method and a method of removing interference of an EM level thereof according to an exemplary embodiment of the present invention will be described in detail with reference to the drawings.

FIG. 1 is a block diagram illustrating a communication system that can apply to a RF relay according to an exemplary embodiment of the present invention.

Referring to FIG. 1, the communication system includes a base station 100, a terminal 200, and a RF relay 300.

The base station 100 and the terminal 200 perform communication through modulation channels 10 and 20. That is, the RF relay 300 receives a radio frequency (RF) signal that is transmitted by the base station 100 through the modulation channel 10, converts and transmits the RF signal to the terminal 200 through the modulation channel 20, receives a RF signal that is transmitted by the terminal 200 through the modulation channel 20, and converts and transmits the RF signal to the base station 100 through the modulation channel 10.

The RF relay 300 according to an exemplary embodiment of the present invention operates in a full-duplex method. Thereby, a transmitting signal of the RF relay 300 can be received again in the RF relay 300 through an interference channel 30. That is, in the RF relay 300 operating in a full-duplex method, a transmitting signal operates as an interference signal.

Therefore, the RF relay 300 according to an exemplary embodiment of the present invention designs a transmitting signal to cancel a transmitting signal passing through the interference channel 30. Thereafter, the RF relay 300 allows a transmitting signal to be not received or to be received in a minimum size through the interference channel 30.

Figure 2:
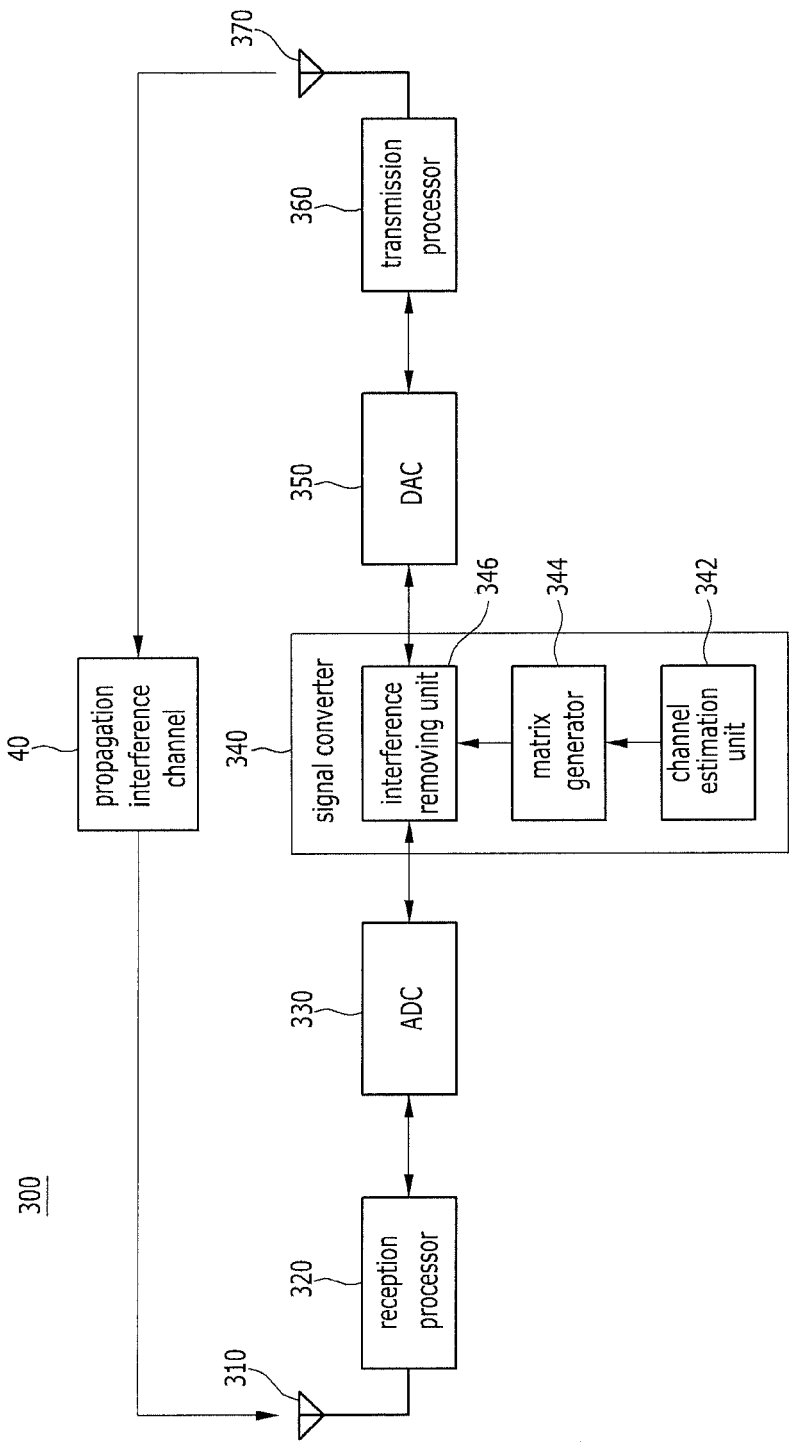
FIG. 2 is a block diagram illustrating a RF relay of a full-duplex method according to an exemplary embodiment of the present invention.

FIG. 2 is a block diagram illustrating a RF relay of a full-duplex method according to an exemplary embodiment of the present invention.

Referring to FIG. 2, the RF relay 300 includes a receiving antenna 310, a reception processor 320, an analog-digital converter (ADC) 330, a signal converter 340, a digital-analog converter (DAC) 350, a transmission processor 360, and a transmitting antenna 370.

The receiving antenna 310 receives a RF signal.

The reception processor 320 amplifies and filters a RF signal that is received through the receiving antenna 310, and down-converts the RF signal to an intermediate frequency signal.

The ADC 330 samples an intermediate frequency signal that is down-converted by the reception processor 320, and converts the intermediate frequency signal to a digital intermediate frequency signal.

The signal converter 340 includes a channel estimation unit 342, a matrix generator 344, and an interference removing unit 346. The channel estimation unit 342 estimates the modulation channels 10 and 20 and the interference channel 30 using a pilot signal, and the matrix generator 344 generates a conversion matrix for removing an interference signal of an EM level and optimizes performance of the RF relay 300 using an estimate of the modulation channels 10 and 20 and the interference channel 30. The interference removing unit 346 multiplies a conversion matrix by a digital intermediate frequency signal, and outputs the digital intermediate frequency signal to the DAC 350. Here, the interference channel 30 is a channel including the DAC 350 to the receiving antenna 310, i.e., the DAC 350, the transmission processor 360, the transmitting antenna 370, a propagation interference channel 40 that is formed between the transmitting antenna 370 and the receiving antenna 310, and a channel including the receiving antenna 310. Further, the modulation channel 10 of FIG. 1 is a channel including a transmission processor (not shown) of the base station 100, the reception processor 320 of the RF relay 300, and a radio channel between the base station 100 and the RF relay 300, and the modulation channel 20 is a channel including the transmission processor 360 of the RF relay 300, a reception processor (not shown) of the terminal 200, and a radio channel between the RF relay 300 and the terminal 200. The radio channel is a channel including a transmitting and receiving antenna and a propagation channel. The propagation channel is a physical phenomenon such as reflection and refraction that are generated while electromagnetic waves propagate.

The DAC 350 converts a digital intermediate frequency signal that is converted by the signal converter 340 to an analog intermediate frequency signal.

The transmission processor 360 up-converts an analog intermediate frequency signal that is converted by the DAC 350 to a RF signal, and amplifies and filters the RF signal.

The transmitting antenna 370 transmits the up-converted RF signal.

The RF relay 300 according to an exemplary embodiment of the present invention multiplies a conversion matrix by a digital intermediate frequency signal and outputs the digital intermediate frequency signal, thereby canceling a transmitting signal by the transmitting antenna 370 while passing through the interference channel 30. That is, an interference signal that can be generated when a transmitting signal by the transmitting antenna 370 passes through the interference channel 30 is not received in the reception processor 320 or can be received in a minimum size.

Next, a method of generating a conversion matrix in the RF relay 300 according to an exemplary embodiment of the present invention will be described in detail with reference to FIGS. 3 and 4.

Figure 3:
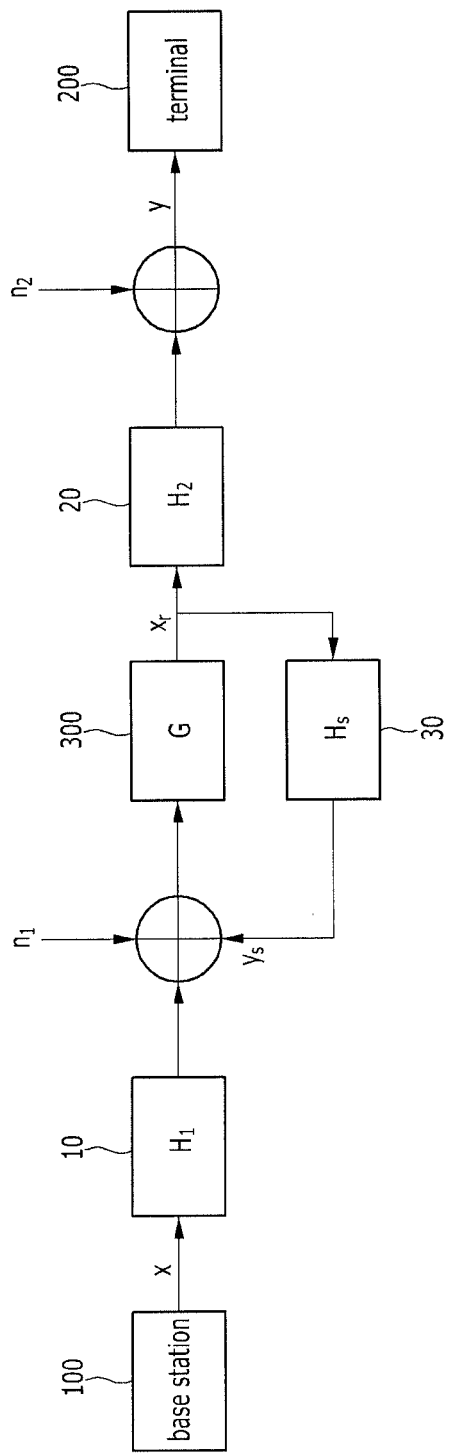
FIG. 3 is a block diagram illustrating a signal model for deriving a conversion matrix in a RF relay according to an exemplary embodiment of the present invention.
Figure 4:
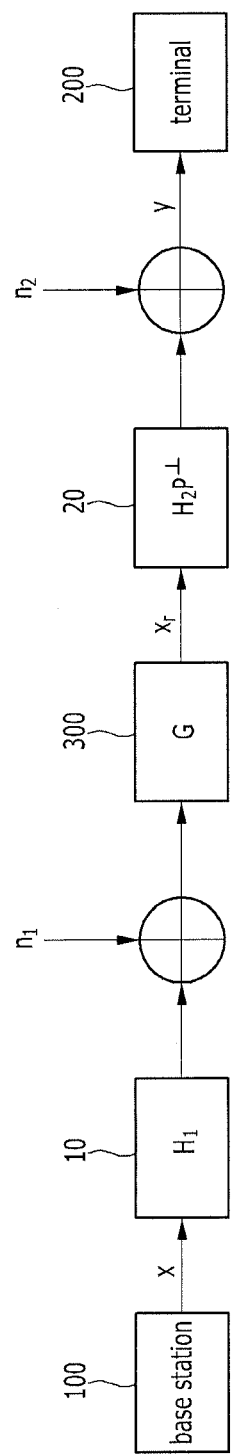
FIG. 4 is a block diagram illustrating a signal model in which an interference signal is removed by including a projection matrix to a null space of an interference channel in a structure of a RF relay in the signal model of FIG. 3.

FIG. 3 is a block diagram illustrating a signal model for deriving a conversion matrix in a RF relay according to an exemplary embodiment of the present invention, and FIG. 4 is a block diagram illustrating a signal model in which an interference signal is removed by including a projection matrix to a null space of an interference channel in a structure of a RF relay. FIGS. 3 and 4 illustrate a signal in operation in which the RF relay 300 transmits a signal that is transmitted by the base station 100 to the terminal 200.

Referring to FIG. 3, when an interference signal is not removed, a received signal y in the terminal 200 is given by Equation 1.

$$y = H_2(I_R - GH_s)^{-1}GH_1x + H_2(I_R - GH_s)^{-1}Gn_1 + n_2 \quad \text{(Equation 1)}$$

In Equation 1, y represents a received signal in the terminal 200, and x represents a transmitted signal in the base station 100. $H_1$ represents a channel matrix of the modulation channel 10 between the base station 100 and the RF relay 300, $H_2$ represents a channel matrix of the modulation channel 20 between the RF relay 300 and the terminal 200, and $H_s$ represents a channel matrix of the interference channel 30. $n_1$ represents noise that is added to a reception terminal of the RF relay 300, and $n_2$ represents noise that is added to a reception terminal of the terminal 100. G represents a conversion matrix that is generated in the RF relay 300, and $I_R$ represents an R×R identity matrix.

In this case, a transmitted signal $x_r$ of the RF relay 300 is given by Equation 2.

$$x_r = G(H_1x + n_1 + H_sx_r) \quad \text{(Equation 2)}$$

Thereafter, when Equation 2 is solved for a transmitted signal $x_r$, Equation 2 can be written as Equation 3.

$$x_r = (I_R - GH_s)^{-1}G(H_1x + n_1) \quad \text{(Equation 3)}$$

An interference signal $y_s$ that is received in the RF relay 300 is given by multiplication of the interference channel $H_s$ and a transmitted signal $x_r$ of the RF relay 300, as shown in Equation 4.

$$y_s = H_s(I_R - GH_s)^{-1}G(H_1x + n_1) \quad \text{(Equation 4)}$$

When applying a matrix inversion lemma to Equation 4, the interference signal $y_s$ is given by Equation 5.

$$y_s = (I_R - H_sG)^{-1}H_sG(H_1x + n_1) \quad \text{(Equation 5)}$$

As a method of removing an interference signal $y_s$ in Equation 5, the conversion matrix G of the RF relay 300 can be generated to belong to a null space of the interference channel $H_s$, as in Equation 6.

$$H_sG = 0 \quad \text{(Equation 6)}$$

That is, the signal converter 340 of the RF relay 300 generates a conversion matrix G to satisfy a condition of Equation 6. Accordingly, the interference signal $y_s$ of an EM level can be removed. When the interference signal $y_s$ of an EM level is removed, a received signal of the terminal 200 that is described in Equation 1 is given by Equation 7.

$$y = H_2GH_1x + H_2Gn_1 + n_2 \quad \text{(Equation 7)}$$

The signal converter 340 of the RF relay 300 according to an exemplary embodiment of the present invention may generate a conversion matrix G by further considering a condition that optimizes performance of the RF relay 300 as well as the condition of Equation 6. Here, in order to optimize performance of the RF relay 300, the signal converter 340 of the RF relay 300 uses mutual information between the base station 100 and the terminal 200 or a signal-to-interference plus noise ratio (SINR) of the terminal 200 as an objective function, and may generate a conversion matrix that maximizes the mutual information or the SINR.

Further, the signal converter 340 of the RF relay 300 uses a mean squared error (MSE) between a transmitting signal of the base station 100 and a received signal of the terminal 200 or a bit error rate (BER) between a transmitting signal of the base station 100 and a received signal of the terminal 200 as an objective function, and may generate a conversion matrix that minimizes the MSE or the BER.

Hereinafter, a method of using mutual information between the base station 100 and the terminal 200 as a objective function and generating a conversion matrix G that maximizes the mutual information is described.

That is, a problem of obtaining a conversion matrix G in order to optimize performance of the RF relay 300 as well as removal of the interference signal is described as an optimization problem of Equation 8.

$$\text{minimize } f(H_1, H_2, G)$$

$$\text{subject to } p(H_1, G) \leq P_r$$

$$H_sG = 0 \quad \text{(Equation 8)}$$

In Equation 8, f represents an objective function, p represents a power constraint of the RF relay 300, and $P_r$ represents maximum output power, of the RF relay 300.

When a solution of Equation 8 is obtained, an optimum conversion matrix G can be obtained. However, because the solution of Equation 8 is generally not represented as a closed form solution, the solution is approximately obtained using a numerical method.

The signal converter 340 of the RF relay 300 according to an exemplary embodiment of the present invention obtains a second best conversion matrix using a projection matrix $P^\perp$ to a null space of the interference channel. That is, the signal converter 340 of the RF relay 300 can generate a second best conversion matrix by obtaining a value of the conversion matrix G in a state where a final condition ($H_sG = 0$) is excluded in Equation 8 and multiplying a projection matrix $P^\perp$ to the left of the conversion matrix G. The second best conversion matrix has low performance compared with an optimum conversion matrix, but because the second best conversion matrix can use a solution of an optimum half-duplex relay method in which the solution is already obtained, the second best conversion matrix can be easily embodied.

The projection matrix $P^\perp$ can be written as Equation 9.

$$P^\perp = I_R - H_s^H(H_sH_s^H)^\dagger H_s \quad \text{(Equation 9)}$$

In Equation 9, † represents a Moore-Penrose pseudo inverse.

When the projection matrix $P^\perp$ of Equation 9 is multiplied by the channel matrix $H_s$ of the interference channel, the projection matrix becomes a zero matrix and satisfies a final condition of Equations 6 and 8.

In this way, a signal model of a communication system including the projection matrix $P^\perp$ is represented, as shown in FIG. 4.

Referring to FIG. 4, an optimization problem of Equation 8 can be solved by changing to an optimization problem of Equation 10.

$$\text{minimize } f(H_1, H_2P^\perp, G)$$

$$\text{subject to } p(H_1, G) \leq P_r \quad \text{(Equation 10)}$$

The signal converter 340 of the RF relay 300 according to an exemplary embodiment of the present invention uses an objective function for maximizing mutual information between the base station 100 and the terminal 200, and the mutual information is represented by Equation 11 using Equation 10.

$$I(y, x) = \log_2 \det\left[I_N + \frac{P_s}{M}(H_2GH_1)(H_2GH_1)^H(\sigma_R^2 H_2 GG^H H_2^H + \sigma_D^2 I_N)^{-1}\right]$$ (Equation 11)

In Equation 11, $P_s$ represents transmission power of the base station 100, and M represents the number of transmitting antennas of the base station 100. $\sigma_R^2$ represents noise variance of the RF relay 300, and $\sigma_D^2$ represents noise variance of the terminal 200.

Further, as a power constraint of the RF relay 300, an average power constraint of Equation 12 or a per-antenna power constraint of Equation 13 can be considered, and in an exemplary embodiment of the present invention, an average power constraint is considered.

$$tr\{G(H_1 R_x H_1^H + R_{n_1})G^H\} \leq P_r$$ (Equation 12)

In Equation 12, tr { } represents the sum of diagonal elements in a square matrix, and $R_x$ and $R_{n1}$ represent covariance matrices of a transmitted signal x and noise n1, respectively. Further, H represents a Hermitian transpose of the matrix.

$$e_i^T R_{x_1} e_i = e_i^T G(H_1 R_x H_1^H + R_{n_1}) G^H e_i \leq \overline{P}_i$$ (Equation 13)

In Equation 13, T represents a transpose of the matrix, and $\overline{P}_i$ represents maximum power of an i-th transmitting antenna of the RF relay 300.

When singular value decomposition (SVD) of the channel matrixes $H_1$ and $H_2$ of the modulation channels 10 and 20 is given, as in Equation 14, a conversion matrix G that maximizes mutual information of Equation 11 has a decomposition form of Equation 15.

$$H_1 = U_1 \Lambda_1 V_1^H,$$

$$H_2 P^\perp = U_2 \Lambda_2 V_2^H$$ (Equation 14)

$$G = V_2 \tilde{G} U_1^H$$ (Equation 15)

In Equation 15, $V_2$ represents a right singular vector of $H_2 P^\perp$, $U_1$ represents a left singular vector of $H_1$, and $\tilde{G}$ represents a diagonal matrix.

When a decomposition form of Equation 15 is substituted to Equations 11 and 12, a problem of obtaining an optimum conversion matrix G is described as an optimization problem of Equation 16.

$$\text{maximize} \quad \sum_{k=1}^{R} \log_2\left(1 + \frac{P_s}{M}\frac{\lambda_{1,k}\lambda_{2,k}|g_k|^2}{\sigma_R^2 \lambda_{2,k}|g_k|^2 + \sigma_D^2}\right)$$ (Equation 16)

$$\text{subject to} \quad |g_k|^2 \geq 0, k = 1, \ldots, R$$

$$\sum_{k=1}^{R}\left(\frac{P_s}{M}\lambda_{1,k} + \sigma_R^2\right)|V_{ik}|^2|g_k|^2 \leq \overline{P}_i$$

In Equation 16, $\lambda_{1,k}$ and $\lambda_{2,k}$ represent a square of a k-th singular value of $H_1$ and $H_2 P^\perp$, respectively, and $g_k$ represents a k-th diagonal element of a diagonal matrix $\tilde{G}$.

That is, when $g_k$ is obtained from Equation 16, a k-th diagonal element of the diagonal matrix $\tilde{G}$ is obtained, and when the k-th diagonal element is applied to Equation 15, a conversion matrix G is obtained.

Finally, when a projection matrix $P^\perp$ is multiplied by the conversion matrix, a second best conversion matrix is finally obtained.

Figure 5:
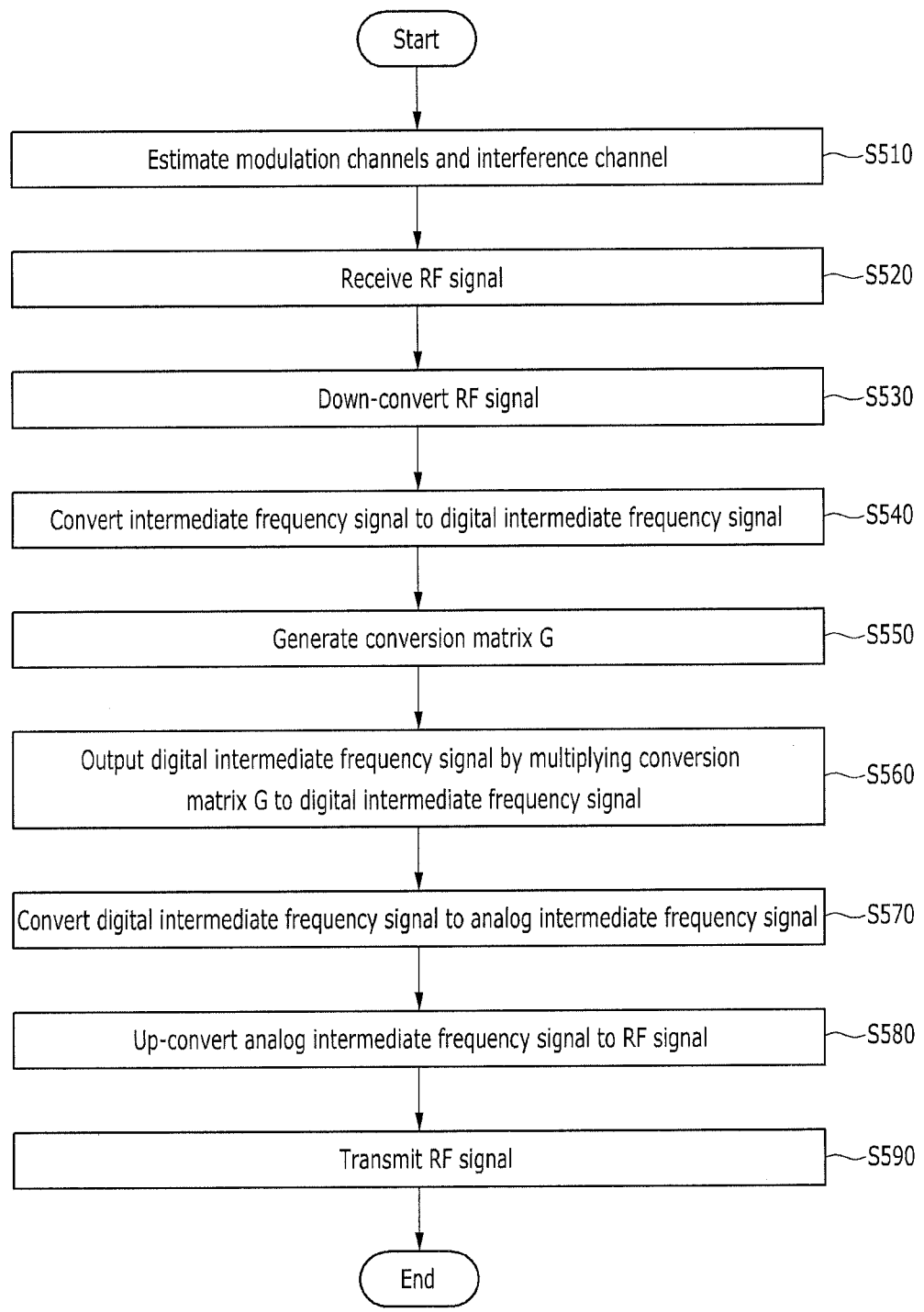
FIG. 5 is a flowchart illustrating a method of removing an interference signal of an EM level in a RF relay of a full-duplex method according to an exemplary embodiment of the present invention.

FIG. 5 is a block diagram illustrating a method of removing an interference signal of an EM level in a RF relay of a full-duplex according to an exemplary embodiment of the present invention.

Referring to FIG. 5, the signal converter 340 of the RF relay 300 should know a channel matrix $H_s$ of the interference channel 30 and channel matrices $H_1$ and $H_2$ of the modulation channels 10 and 20, and thus estimates the modulation channels 10 and 20 and the interference channel 30 using a pilot signal (S510).

Thereafter, when a RF signal is received from the base station 100 through the receiving antenna 310 (S520), the reception processor 320 amplifies and filters a RF signal and down-converts the RF signal to an intermediate frequency signal (S530), and the ADC 330 converts the intermediate frequency signal to a digital intermediate frequency signal (S540).

The signal converter 340 generates a conversion matrix G from an estimate of the modulation channels 10 and 20 and the interference channel 30 (S550).

The signal converter 340 converts the digital intermediate frequency signal by multiplying the conversion matrix G to the digital intermediate frequency signal (S560).

Thereafter, the DAC 350 converts the converted digital intermediate frequency signal to an analog intermediate frequency signal (S570), and the transmission processor 360 again up-converts the analog intermediate frequency signal to a RF signal and amplifies and filters the RF signal (S580). The up-converted RF signal is transmitted to the terminal 100 through the transmitting antenna 370 (S590).

In this way, a RF signal that is transmitted through the transmitting antenna 370 is a signal that is converted by the conversion matrix G that is generated in the signal converter 340 and may be canceled while passing through the interference channel 30.

Figure 6:
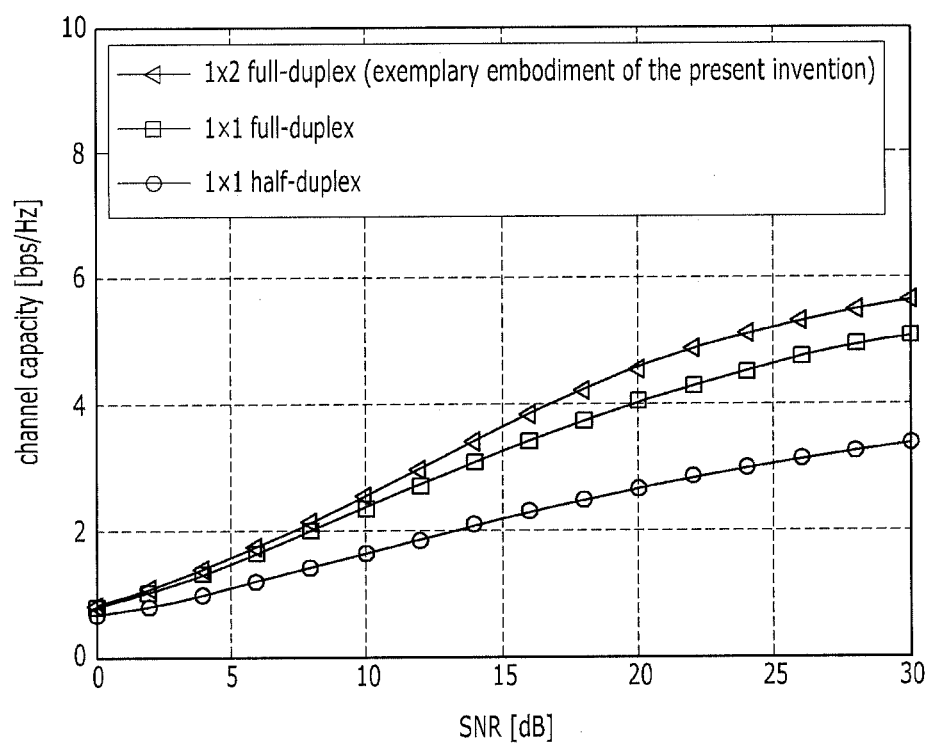
FIG. 6 is a graph illustrating a channel capacity between a base station and a terminal.

FIG. 6 is a graph illustrating a channel capacity between a base station and a terminal. In FIG. 6, when a signal to noise ratio (SNR) between the RF relay 300 and the terminal 200 is 20 dB, a channel capacity according to an SNR between the base station 100 and a RF relay of a 1×1 half-duplex method, a channel capacity according to an SNR between the base station 100 and a RF relay of a 1×1 full-duplex method, and a channel capacity according to an SNR between the base station 100 and the RF relay 300 of a 1×2 full-duplex method according to an exemplary embodiment of the present invention are represented as a graph. Here, in "1×2", "1" is the number of receiving antennas of the RF relay 300, and "2" is the number of transmitting antennas.

Referring to FIG. 6, when using the RF relay 300 of a 1×2 full-duplex method according to an exemplary embodiment of the present invention, a channel capacity can be improved, compared with a RF relay of 1×1 half-duplex method.

Particularly, it is expected that a RF relay of a full-duplex method according to an exemplary embodiment of the present invention will become central technology in a 4G system requiring high spectral frequency efficiency in order to transmit data at a high speed.

An exemplary embodiment of the present invention may not only be embodied through the above-described apparatus and/or method, but may also be embodied through a program that implements a function corresponding to a configuration of an exemplary embodiment of the present invention or a recording medium on which the program is recorded, and can be easily embodied by a person of ordinary skill in the art from a description of the foregoing exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of removing an interference signal of an electromagnetic wave (EM) level that is received through an interference channel in a RF relay of a full-duplex that relays a radio frequency signal between a base station and a terminal, the method comprising:
   estimating a modulation channel between the base station and the RF relay and between the RF relay and the terminal, and an interference channel,
   generating a first conversion matrix to satisfy an objective function and a power constraint using the estimated modulation channel and the interference channel;
   generating a projection matrix to a null space of a channel matrix of the interference channel, the projection matrix being different than the first conversion matrix;
   generating a second conversion matrix by multiplying the first conversion matrix by the projection matrix;
   generating a transmitting signal by converting a received signal using the second conversion matrix; and
   transmitting the transmitting signal.

2. The method of claim 1, wherein the transmitting signal is canceled while passing through the interference channel.

3. The method of claim 1, wherein the estimating of a modulation channel and the interference channel comprises estimating the modulation channel and the interference channel using a pilot signal.

4. The method of claim 1, wherein the objective function is mutual information between the terminal and the base station, and the generating of the first conversion matrix comprises generating a conversion matrix that maximizes the mutual information.

5. The method of claim 1, wherein the objective function is a signal-to-interference plus noise ratio (SINR) in the terminal, and the generating of the first conversion matrix comprises generating a conversion matrix that maximizes the SINR.

6. The method of claim 1, wherein the objective function is a mean squared error between a transmitting signal of the base station and a received signal of the terminal, and the generating of the first conversion matrix comprises generating a conversion matrix that minimizes the mean squared error.

7. The method of claim 1, wherein the objective function is a bit error rate between a transmitting signal of the base station and a received signal of the terminal, and the generating of the first conversion matrix comprises generating a conversion matrix that minimizes the bit error rate.

8. The method of claim 1, wherein an average power constraint or per-antenna power constraint is used as the power constraint.

9. A RF relay of a full-duplex, comprising:
   a channel estimation unit that estimates a modulation channel between a base station and the RF relay, and between the RF relay and a terminal, and an interference channel;
   a matrix generator that generates a first conversion matrix to satisfy an objective function and a power constraint using the estimated modulation channel and the interference channel, generates a projection matrix to a null space of a channel matrix of the interference channel that is different than the first conversion matrix, and generates a second conversion matrix by multiplying the first conversion matrix by the projection matrix; and
   an interference removing unit that generates a transmitting signal by converting a received signal using the second conversion matrix.

10. The RF relay of claim 9, wherein the transmitting signal is canceled while passing through the interference channel.

11. The RF relay of claim 9, wherein the objective function uses one of mutual information between the terminal and the base station, an SINR in the terminal, a mean squared error between a transmitting signal of the base station and a received signal of the terminal, and a bit error rate between a transmitting signal of the base station and a received signal of the terminal.

12. The RF relay of claim 9, wherein the matrix generator uses an average power constraint or per-antenna power constraint as the power constraint.

13. The RF relay of claim 9, further comprising:
   a reception processor that down-converts the received signal to an intermediate frequency signal;
   an analog-digital converter that converts the intermediate frequency signal to a digital signal and that outputs the digital signal to the interference removing unit;
   a digital-analog converter that converts a signal that is converted from the interference removing unit to an analog signal; and
   a transmission processor that up-converts the analog signal to a radio frequency signal and that outputs the radio frequency signal as the transmitting signal.

* * * * *

UNITED STATES PATENT AND TRADEMARK OFFICE
CERTIFICATE OF CORRECTION

PATENT NO.       : 8,606,175 B2                                                Page 1 of 1
APPLICATION NO.  : 12/956504
DATED            : December 10, 2013
INVENTOR(S)      : Kwak et al.

It is certified that error appears in the above-identified patent and that said Letters Patent is hereby corrected as shown below:

On the Title Page Item [73] (Assignee), after "Electronics and Telecommunications Research Institute, Daejeon (KR)" insert -- Postech Academy-Industry Foundation, Pohang-city (KR) --.

Signed and Sealed this
Twenty-seventh Day of January, 2015

Michelle K. Lee
*Deputy Director of the United States Patent and Trademark Office*